United States Patent [19]
Feyh et al.

[11] Patent Number: 6,111,710
[45] Date of Patent: Aug. 29, 2000

[54] ASYNCHRONOUS/SYNCHRONOUS GAIN CONTROL FOR INTERPOLATED TIMING RECOVERY IN A SAMPLED AMPLITUDE READ CHANNEL

[75] Inventors: German S. Feyh, Boulder; Sian She, Broomfield; William G. Bliss, Thornton, all of Colo.

[73] Assignee: Cirrus Logic, Inc., Fremont, Calif.

[21] Appl. No.: 08/882,473

[22] Filed: Jun. 25, 1997

[51] Int. Cl.$^7$ ............................... G11B 5/09; G11B 5/035
[52] U.S. Cl. ................... 360/46; 360/51; 360/65
[58] Field of Search ................... 360/65, 40, 46, 360/51

[56] References Cited

U.S. PATENT DOCUMENTS

| | | |
|---|---|---|
| 5,297,184 | 3/1994 | Behrens et al. . |
| 5,321,559 | 6/1994 | Nguyen et al. ............................ 360/46 |
| 5,375,145 | 12/1994 | Abbott et al. ............................. 375/98 |
| 5,438,460 | 8/1995 | Coker et al. . |
| 5,448,424 | 9/1995 | Hirano et al. . |
| 5,721,754 | 2/1998 | Chen ....................................... 375/227 |
| 5,726,818 | 3/1998 | Reed et al. ................................ 360/51 |
| 5,796,535 | 8/1998 | Tuttle et al. ............................... 360/51 |
| 5,802,118 | 9/1998 | Bliss et al. ................................ 375/350 |

FOREIGN PATENT DOCUMENTS 0 595 454 A2  5/1994  European Pat. Off. .

*Primary Examiner*—Paul Loomis
*Assistant Examiner*—Regina Y. Neal
*Attorney, Agent, or Firm*—Howard H. Sheerin; Dan Shifrin

[57] ABSTRACT

A sampled amplitude read channel is disclosed for reading data recorded on a disk storage medium by asynchronously sampling an analog read signal, equalizing the asynchronous sample values according to a desired partial response, and interpolating the equalized sample values to generate synchronous sample values substantially synchronized to a baud rate of the recorded data. The read channel further comprises a gain control circuit which generates a gain error for adjusting the amplitude of the analog read signal to a nominal value through a variable gain amplifier (VGA). During acquisition, the gain error is computed from the asynchronous sample values at the output of the sampling device in order to avoid the delay associated with the discrete equalizer filter and the timing recovery interpolation filter. This decreases the acquisition time and the corresponding length of the acquisition preamble, thereby reserving more area on the disk to record user data. After acquisition and while tracking the random user data, the gain control loop is reconfigured to generate the gain error according to using the synchronous, interpolated sample values output by the timing recovery circuit.

14 Claims, 12 Drawing Sheets

ASYNCHRONOUS/SYNCHRONOUS GAIN CONTROL FOR INTERPOLATED TIMING RECOVERY IN A SAMPLED AMPLITUDE READ CHANNEL

CROSS REFERENCE TO RELATED APPLICATIONS AND PATENTS

This application is related to other U.S. patent applications, namely application Ser. No. 08/751,880 now U.S. Pat. No. 5,835,295, entitled "Zero Phase Restart for Interpolated Timing Recovery in a Sampled Amplitude Read Channel," Ser. No. 08/640,410 entitled "Gain and Phase Constrained Adaptive Equalizing Filter in a Sampled Amplitude Read Channel for Magnetic Recording," Ser. No. 08/341,251, now abandoned, entitled "Sampled Amplitude Read Channel Comprising Sample Estimation Equalization, Defect Scanning, Channel Quality, Digital Servo Demodulation, PID Filter for Timing Recovery, and DC Offset Control," and Ser. No. 08/701,572, now U.S. Pat. No. 5,754,352, entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," and U.S. Pat. No. 5,424,881 entitled "Synchronous Read Channel." All of the above-named patent applications and patents are assigned to the same entity, and all are incorporated herein by reference.

FIELD OF INVENTION

The present invention relates to the control of disk storage systems for digital computers (such as magnetic and optical), particularly to a sampled amplitude read channel that employs a gain control circuit for computing a gain error from asynchronous samples of an analog read signal when reading an acquisition preamble, and for computing the gain error from synchronous, interpolated sample values when reading random user data.

BACKGROUND OF THE INVENTION

Computer storage systems (such as optical, magnetic, and the like) record digital data onto the surface of a storage medium, which is typically in the form of a rotating magnetic or optical disk, by altering a surface characteristic of the disk. The digital data serves to modulate the operation of a write transducer (write head) which records binary sequences onto the disk at a predetermined baud rate in radially concentric or spiral tracks. In magnetic recording systems, for example, the digital data modulates the current in a write coil in order to record a series of magnetic flux transitions onto the surface of a magnetizable disk. And in optical recording systems, for example, the digital data may modulate the intensity of a laser beam in order to record a series of "pits" onto the surface of an optical disk. When reading this recorded data, a read transducer (read head), positioned in close proximity to the rotating disk, senses the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete-time sequence detector in a sampled amplitude read channel. Discrete-time sequence detectors are preferred over simple analog pulse detectors because they compensate for intersymbol interference (ISI) and are less susceptible to channel noise. Consequently, discrete-time sequence detectors increase the capacity and reliability of the storage system.

There are several well known discrete-time sequence detection methods including discrete-time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In a conventional peak detection read channel, analog circuitry detects peaks in the continuous time analog read signal generated by the read head. The analog read signal is "segmented" into bit cell periods and interpreted during these segments of time. A peak detected during a bit cell period may represent a binary "1" bit, whereas the absence of a peak may represent a binary "0" bit. Errors in detection occur when the bit cells are not correctly aligned with the analog pulse data. To this end, timing recovery in the read channel adjusts the bit cell periods so that the peaks occur in the center of the bit cells on average in order to minimize detection errors. Since timing information is derived only when peaks are detected, the input data stream is normally run-length limited (RLL) to limit the number of consecutive "0" bits.

As the pulses are packed closer together on the data tracks in the effort to increase data density, detection errors can also occur due to intersymbol interference (ISI), a distortion in the read signal caused by closely spaced, overlapping pulses. This interference can cause a peak to shift out of its bit cell, or decrease the magnitude of the peak, resulting in a detection error. This ISI effect is reduced by decreasing the data density or by employing an encoding scheme that ensures a minimum number of "0" bits occur between "1" bits. For example, a (d,k) run-length limited (RLL) code constrains to d the minimum number of "0" bits between "1" bits, and to k the maximum number of consecutive "0" bits. A typical (1,7) RLL ⅔ rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier (VGA) adjusts the read signal's amplitude to a nominal value consistent with the desired partial response and within the optimum operating range of the sampling device. A low pass analog filter filters the read signal at the output of the VGA to attenuate channel and aliasing noise. After sampling, a discrete equalizer equalizes the sample values according to a desired partial response, and a discrete-time sequence detector, such as a Viterbi detector, interprets the equalized sample values in context to determine a most likely sequence for the recorded digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.,* Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE,* Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications,* Vol. 10 No. 1, January 1992, pp.38–56; and Wood et al, "Viterbi Detection of Class IV Partial Response on a Magnetic Recording Channel", *IEEE Trans. Commun.,* Vol. Com-34, No. 5, pp. 454–461, May 1986; and Coker Et al, "Implementation of PRML in a Rigid Disk Drive", *IEEE Trans. on Magnetics,* Vol. 27, No. 6, Nov. 1991; and Carley et al, "Adaptive Continous-Time Equalization Followed By FDTS/DF Sequence Detection", *Digest of The Magnetic Recording Conference, Aug.* 15–17, 1994, pp. C3; and Moon et al, "Constrained-Complexity Equalizer Design for Fixed Delay Tree Search with Decision Feedback", *IEEE Trans. on Magnetics,* Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics,* Vol. 27, No. 1, January 1991; and Cioffi et al, "Adaptive Equalization in Magnetic-Disk Storage Channels", *IEEE Communication Magazine,* February 1990; and Roger Wood, "Enhanced Decision Feedback Equalization", *Intermag'90.*

The principles disclosed herein are applicable regardless as to the particular discrete-time sequence detection method employed. The present invention applies to the above-identified sequence detection methods as well as others not mentioned, and even future techniques.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error estimate based on the difference between the estimated samples and the read signal samples. A PLL loop filter filters the phase error, and the filtered phase error operates to synchronize the channel samples to the baud rate.

Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

Similar to timing recovery, the gain control loop in sampled amplitude read channels is implemented as a decision-directed feed back system. The gain control loop comprises a gain error detector for generating a gain error based on the difference between the estimated samples and the read signal samples. A loop filter filters the gain error, and the filtered gain error controls the operation of the VGA to adjust the amplitude of the analog read signal until it is consistent with the desired partial response and within the optimum operating range of the sampling device.

A periodic sequence of bits referred to as an acquisition preamble is normally recorded immediately preceding the user data in a sector to allow the gain control and timing recovery loops to "pull-in" to the desired amplitude and to synchronize to the correct frequency and phase of the baud rate. It is desirable to minimize the required length of the acquisition preamble in order to reserve more area on the disk for recording user data. This means minimizing the transport delay in the timing recovery and gain control loops during acquisition to allow for an increase in bandwidth and enable faster "pull-in" times. In prior art sampled amplitude read channels, the transport delay is minimized by removing the discrete equalizer filter from the data path during acquisition. The additional equalization provided by the discrete equalizer is not necessary because the acquisition preamble is substantially a single tone. After acquisition, the discrete equalizer is switched back into the data path in order to read (i.e., track) the random user data.

Although the above technique decreases the acquisition time and the length of the acquisition preamble, the transport delay due to the discrete equalizer still degrades the performance of timing recovery when tracking the user data. Thus, the complexity (order) of the discrete equalizer is typically limited in prior art read channels to minimize the transport delay in the timing recovery loop. The conventional synchronous-sampling timing recovery is also adversely affected by variations in the fabrication process of the analog components, such as the VFO, as well as changes in the operating characteristics of the recording system, such as temperature drift.

The above-referenced co-pending patent application entitled "A Sampled Amplitude Read Channel Employing Interpolated Timing Recovery" discloses a wholly digital timing recovery loop wherein the analog read signal is sampled asynchronously and the asynchronous sample values interpolated to generate the sample values synchronized to the baud rate. This method of timing recovery removes the delay associated with the discrete equalizer from the loop for both acquisition and tracking, which allows for a more complex discrete equalizer. Furthermore, interpolated timing recovery is not affected by process variations or changes in operating characteristics because there are no analog components. However, the prior art method for generating the gain error requires sample values that are synchronized to the baud rate. This means the gain control loop must operate on the interpolated sample values at the output of timing recovery which introduces a significant transport delay during acquisition due to the delay associated with the interpolation filter in the timing recovery circuit.

There is, therefore, a need for an improved gain control loop in a sampled amplitude read channel employing interpolated timing recovery. In particular, an object of the present invention is to avoid the delay associated with the discrete equalizer filter and the timing recovery interpolation filter in order to minimize the acquisition time and the corresponding length of the acquisition preamble.

SUMMARY OF THE INVENTION

A sampled amplitude read channel is disclosed for reading data recorded on a disk storage medium by asynchronously sampling an analog read signal, equalizing the asynchronous sample values according to a desired partial response, and interpolating the equalized sample values to generate synchronous sample values substantially synchronized to a baud rate of the recorded data. The read channel further comprises a gain control circuit which generates a gain error for adjusting the amplitude of the analog read signal to a nominal value through a variable gain amplifier (VGA). During acquisition, the gain error is computed from the asynchronous sample values at the output of the sampling device in order to avoid the delay associated with the discrete equalizer filter and the timing recovery interpolation filter. This decreases the acquisition time and the corresponding length of the acquisition preamble, thereby reserving more area on the disk to record user data. After acquisition and while tracking the random user data, the gain control loop is reconfigured to generate the gain error using the synchronous, interpolated sample values output by the timing recovery circuit.

Two methods are disclosed for computing the gain error using the asynchronous samples at the output of the sampling device. In the first method, the gain error is computed by taking the discrete-time fourier transform (DTFT) of the asynchronous sample values. Preferably, the acquisition preamble is a 2T pattern such that the analog read signal is a sine wave with a frequency $f_B/4$, where $f_B$ is the baud rate of the recorded data. In this manner, the DTFT is computed as:

$$\pi/2 \cdot ((X_0-X_2)^2+(X_1-X_3)^2)^{1/2}$$

where $X_n$ are the discrete-time, asynchronous sample values of the analog read signal. To generate the gain error, it is not actually necessary to compute the square root or to multiply by $\pi/2$ in the above equation. Thus the discrete time gain error can be computed simply as:

$$(X_0-X_2+(X_1-X_3)^2-\text{set\_point}$$

where "set_point" is a constant representing the target gain for the read signal. The constant "set_point" can be selected slightly different than the optimum value for the desired partial response so as to attenuate any transient in switching between the asynchronous and synchronous modes of operation.

In the second embodiment of the present invention, the gain error is computed from the asynchronous sample values by subtracting a target set point from the average energy in the read signal. The average energy for a 2T acquisition preamble can be computed simply as:

$$X_0^2+X_1^2$$

and the gain error computed as:

$$(X_0^2-g)+(X_1^2-g)$$

where $X_0$ and $X_1$ are asynchronous sample values of the analog read signal and g is the target gain. Again, g can be selected slightly different than the optimum value for the desired partial response so as to attenuate any transient in switching between the asynchronous and synchronous modes of operation.

Once the nominal amplitude has been acquired and the read channel begins to track the user data, the bandwidth of the gain control circuit is reduced to attenuate gain variance due to the randomness of the user data. Consequently, the delays associated with the discrete equalizer and timing recovery are not a significant factor during tracking, and the gain error can be computed from the synchronous, interpolated sample values using a more effective tracking gain error equation:

$$\text{sgn}(X_0)(X_0-\sim X_0)+\text{sgn}(X_1)(X_1-\sim X_1)$$

where sgn(x) returns the sign of x and zero if x is zero, $X_0$ and $X_1$ are synchronous, interpolated sample values 102 of the analog read signal, and $\sim X_0$ and $\sim X_1$ are estimated sample values corresponding to ideal target gain values. To compensate for asymmetries in the analog read signal, due for example to magnetoresistive (MR) read heads, the estimated sample values $\sim X_0$ and $\sim X_1$ corresponding to ideal target gain values are programmable and can be calibrated accordingly.

In an alternative embodiment of the present invention, the read channel comprises a coarse gain control circuit for adjusting the amplitude of the analog read signal at the output of the VGA with respect to the optimum operating range of the sampling device, and a wholly-digital fine gain control circuit for adjusting an amplitude of the synchronous, interpolated sample values toward the desired partial response. Only the coarse gain control circuit is operable during acquisition, while both the coarse and fine gain control circuits are operable during tracking.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Figure 1:
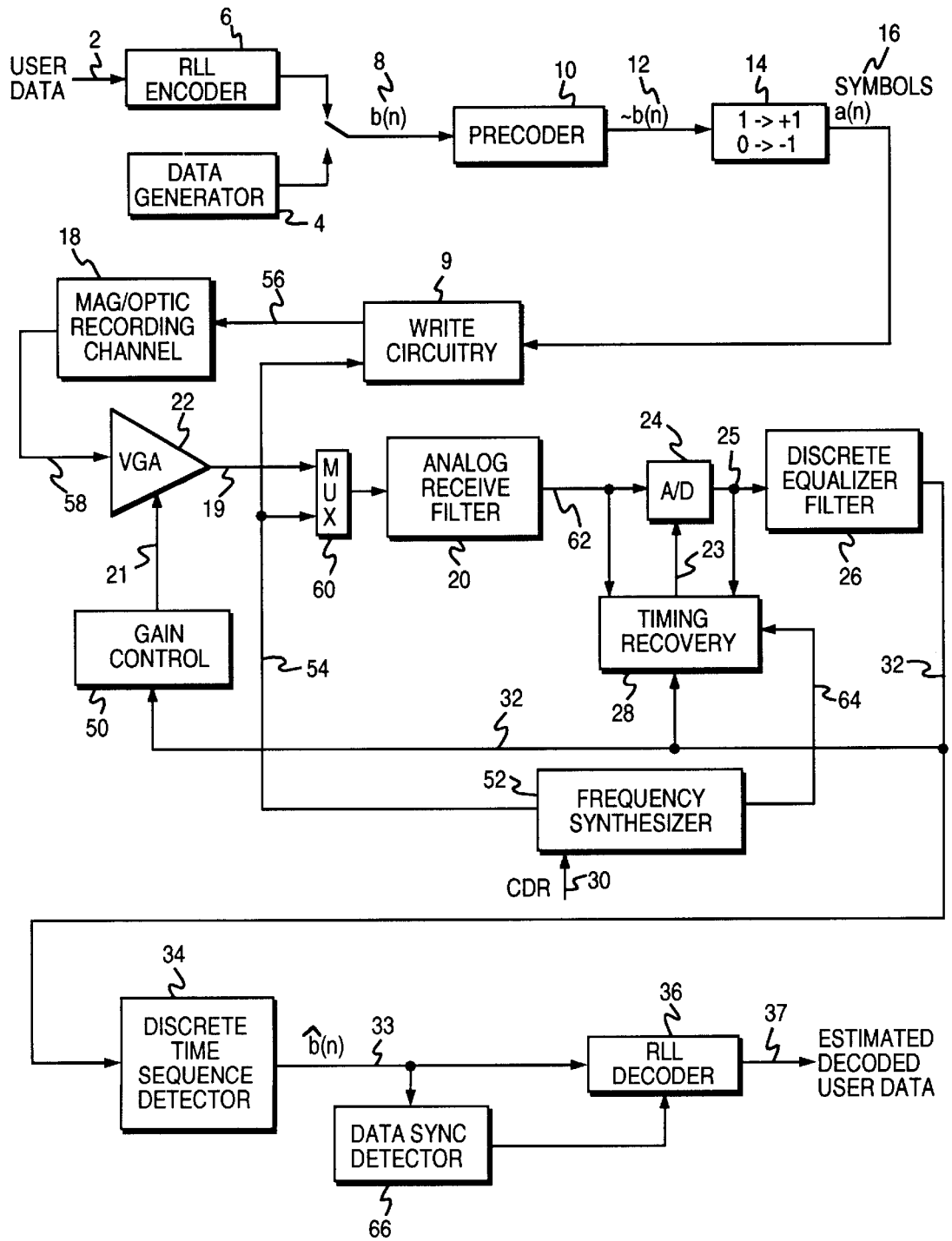
FIG. 1 is a block diagram of a conventional sampled amplitude recording channel employing conventional synchronous-sampling timing recovery.

Conventional Sampled Amplitude Read Channel Referring now to FIG. 1, shown is a detailed block diagram of a conventional sampled amplitude read channel. During a write operation, preamble data from a data generator 4 (for example 2T preamble data) and a sync mark 70 followed by user data 2 are written onto the storage medium. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil (or intensity of a laser beam) at the baud rate 1/T to record the binary sequence onto the storage medium. A frequency synthesizer 52 provides a baud rate write clock 54 to the write circuitry 9 and is adjusted by a channel data rate signal (CDR) 30 according to the zone the recording head is over ("zoned" recording is described below with reference to FIG. 2A).

When reading the recorded binary sequence from the storage medium, timing recovery 28 first locks to the write frequency by selecting, as the input to the read channel, the write clock 54 through a multiplexer 60. Once locked to the write frequency, the multiplexer 60 selects the analog signal 19 from the read head as the input to the read channel in order to acquire the acquisition preamble recorded on the disk prior to the recorded user data. A variable gain amplifier 22 adjusts the amplitude of the analog read signal 58, and an analog filter 20 provides initial equalization toward the desired response as well as attenuating channel and aliasing noise. A sampling device 24 samples the analog read signal 62 from the analog receive filter 20, and a discrete-time equalizer filter 26 provides further equalization of the sample values 25 toward the desired response. In partial response recording, for example, the desired partial response is often selected from Table 1:

TABLE 1

| Channel | Transfer Function | Dipulse Response |
| --- | --- | --- |
| PR4 | $(1 - D)(1 + D)$ | 0, 1, 0, −1, 0, 0, 0, . . . |
| EPR4 | $(1 - D)(1 + D)^2$ | 0, 1, 1, −1, −1, 0, 0, . . . |
| EEPR4 | $(1 - D)(1 + D)^3$ | 0, 1, 2, 0, −2, −1, 0, . . . |

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the frequency of a variable frequency oscillator (VFO) over temperature, voltage, and process variations. The channel data rate (CDR) signal 30 adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples Y(n) 32 are ultimately processed by a discrete-time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 output by the sequence detector 34 into estimated user data 37. A data sync detector 66 detects the sync mark 70 in the data sector 15 (shown in FIG. 2B described below) in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
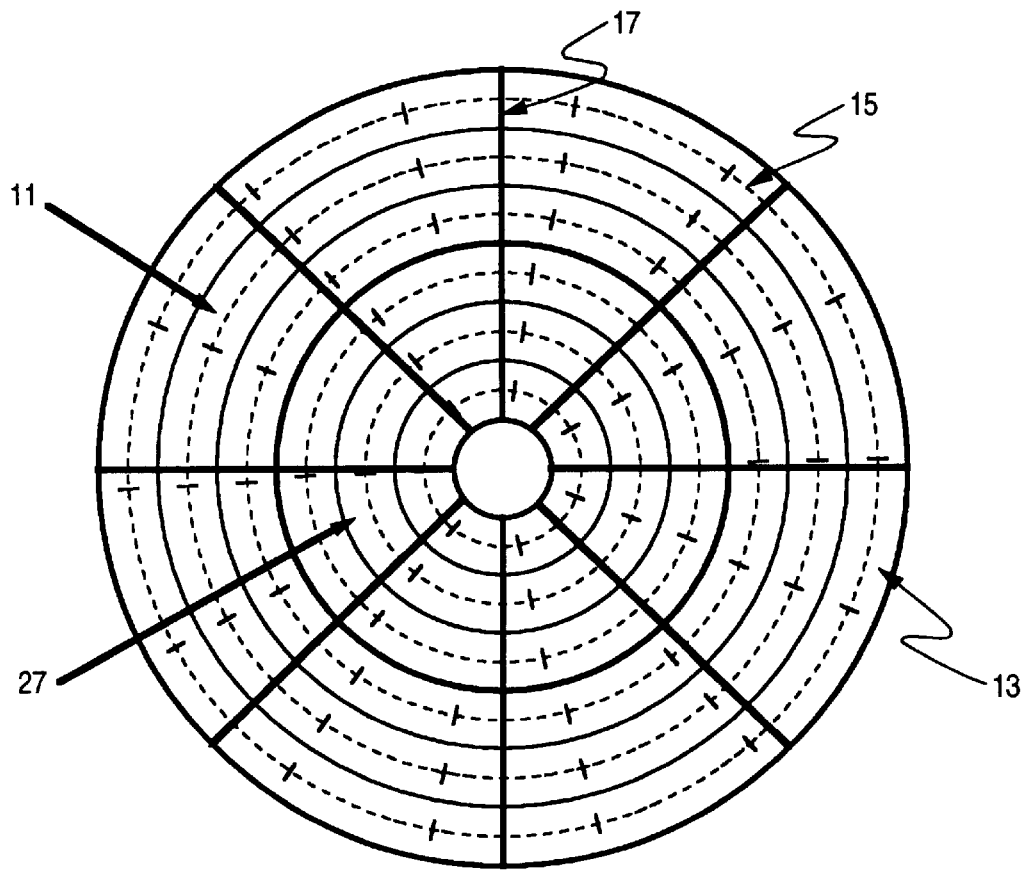
FIG. 2A shows an exemplary data format of a magnetic disk having a plurality of concentric tracks comprised of a plurality of user data sectors and embedded servo data sectors.

FIG. 2A shows an exemplary data format of a magnetic disk storage medium comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The digital information within the servo wedges 17 may be detected by a simple discrete-time pulse detector or by the discrete-time sequence detector 34.

Figure 2B:
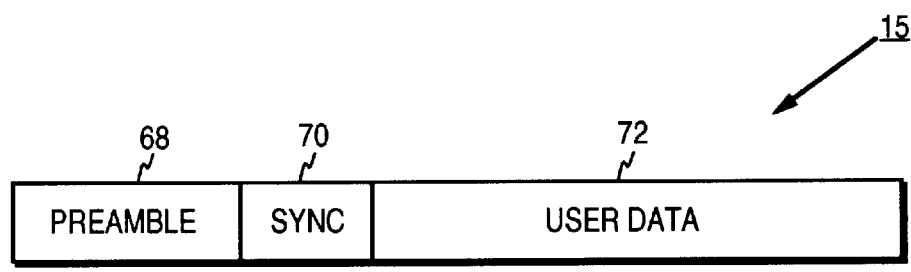
FIG. 2B shows an exemplary format of a data sector.

FIG. 2B shows the format of a data sector 15 comprising an acquisition preamble 68, a sync mark 70, and user data 72. Timing recovery processes the acquisition preamble 68 to acquire the correct sampling frequency and phase before reading the user data 72, and the sync mark 70 signals the beginning of the user data 72 for symbol-synchronizing the RLL decoder 36.

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone. This technique, referred to as "zoned" recording, is made possible due to the decrease in intersymbol interference at the outer diameter tracks.

Improved Sampled Amplitude Read Channel

Figure 3:
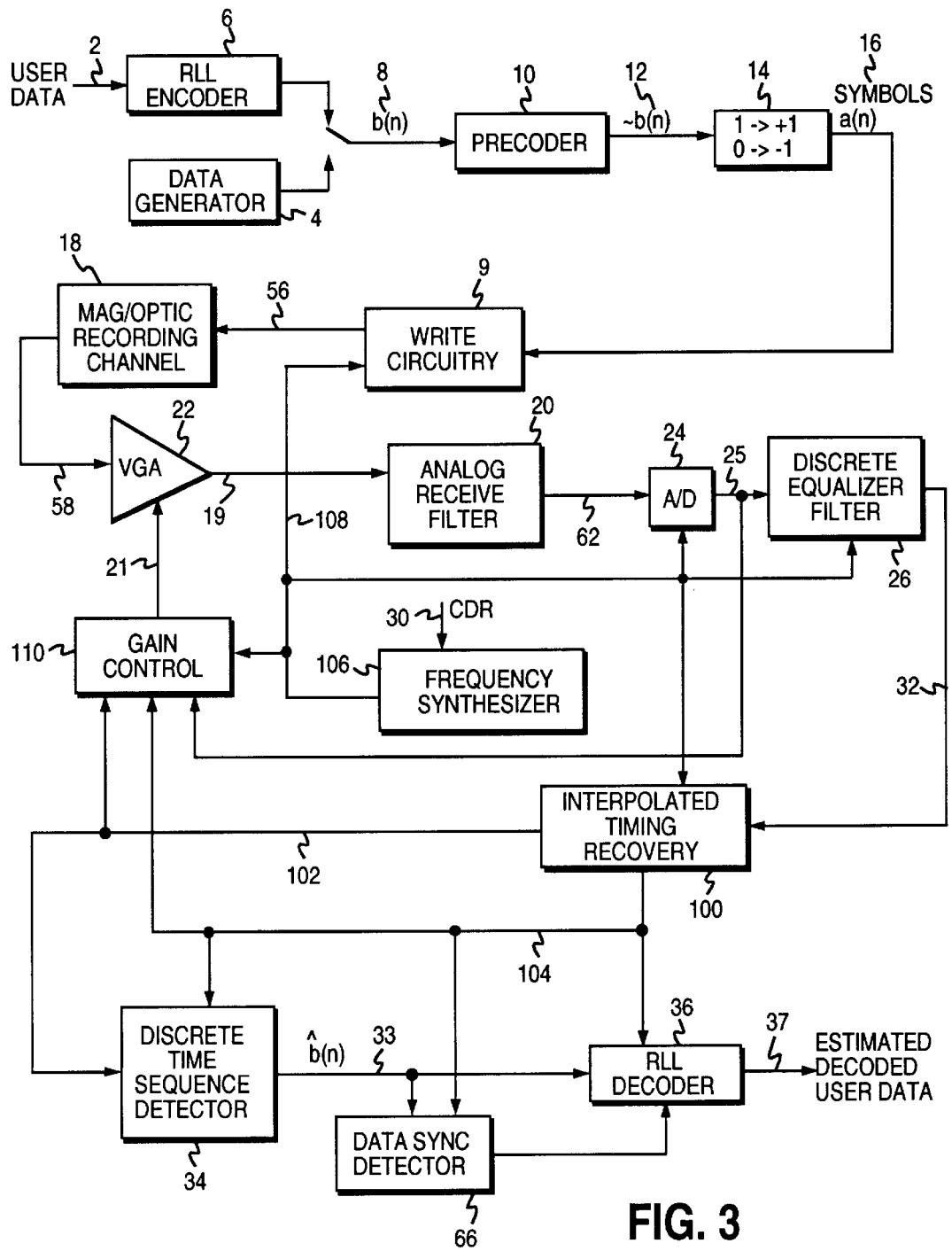
FIG. 3 is a block diagram of the sampled amplitude read channel according to one embodiment of the present invention which comprises interpolated timing recovery (ITR) and an asynchronous/synchronous gain control circuit.

FIG. 3 shows the sampled read channel of the present invention, comprising an asynchronous/synchronous gain control circuit 110 and an interpolated timing recovery (ITR) circuit 100. The sampling device 24 samples the analog read signal asynchronous to the baud rate of the recorded data, and the asynchronous samples 25 are then equalized 26 and interpolated 100 to generate synchronous sample values 102 synchronized to the baud rate. To avoid the delays associated with the discrete equalizer filter 26 and the interpolation filter inside ITR 100 when reading the acquisition preamble 68 of FIG. 2B, the gain control circuit 110 generates a gain error from the asynchronous sample values 25 output by the sampling device 24. The gain error controls the operation of the VGA 22 over line 21 to adjust the amplitude of the analog read signal 19 relative to the optimum operating range of the sampling device 24 and consistent with the desired partial response. After acquisition, the gain control circuit 110 generates the gain error using the synchronous, interpolated sample values 102 output by ITR 100 while tracking the random user data.

A frequency synthesizer 106 generates a baud rate write clock 108 applied to the write circuitry 9 during a write operation, and an asynchronous sampling clock 108 for clocking the sampling device 24, the discrete equalizer 26, gain control 110, and the ITR 100 at a frequency slightly above the baud rate (as determined by the data rate of the current zone (CDR 30)) during a read operation. In an alternative embodiment, a first frequency synthesizer generates the write clock, and a second frequency synthesizer generates the read clock.

A discrete-time sequence detector 34 detects an estimated binary sequence 33 representing the user data from the interpolated sample values 102. The ITR 100 circuit also generates a data clock 104 synchronized to the baud rate on average for clocking operation of the gain control 110, discrete-time sequence detector 34, sync mark detector 66 and RLL decoder 36.

Conventional Timing Recovery

Figure 4A:
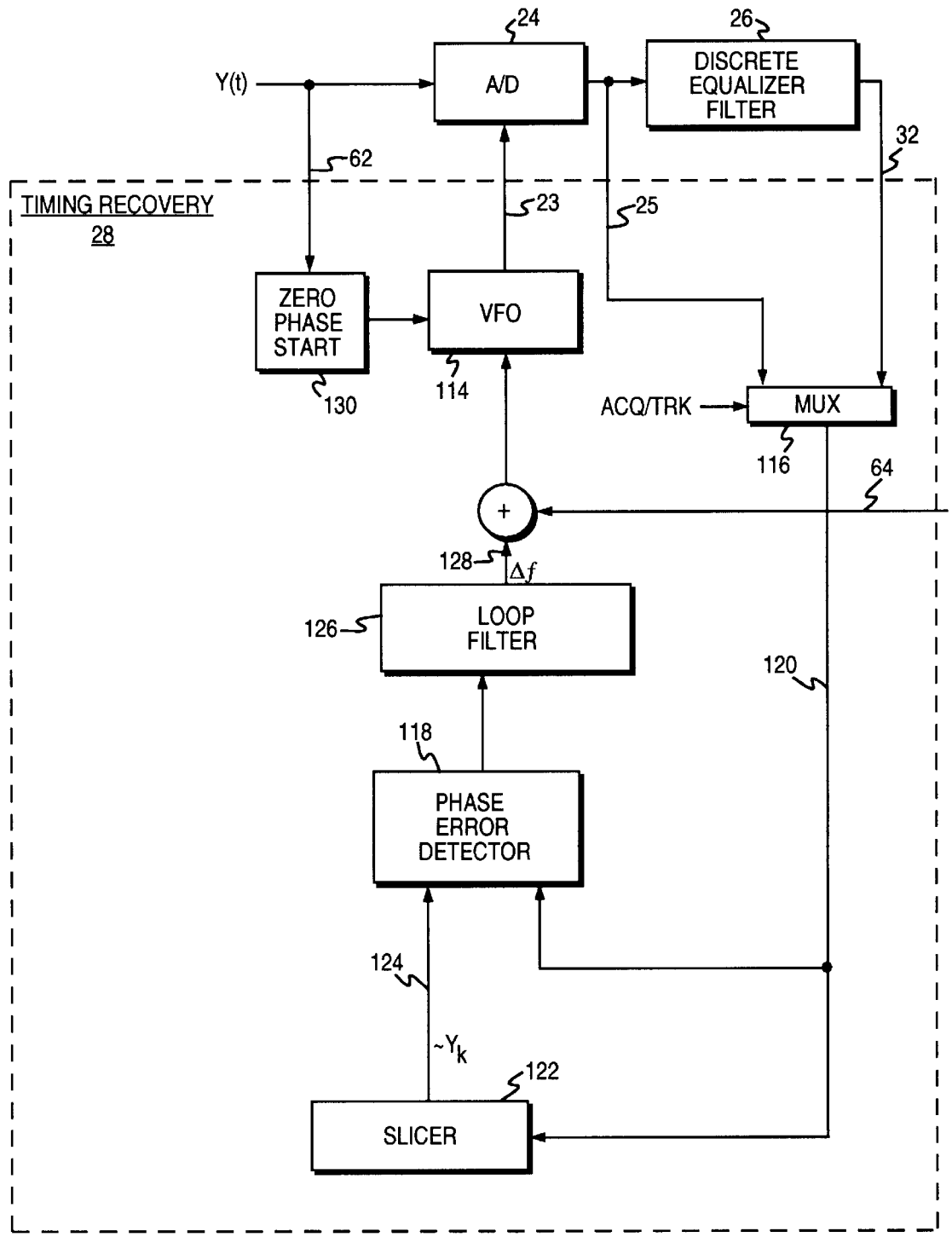
FIG. 4A is a detailed block diagram of the prior art synchronous-sampling timing recovery comprising a sampling VFO for sampling the analog read signal synchronous to the baud rate.

An overview of the conventional synchronous-sampling timing recovery 28 of FIG. 1 is shown in FIG. 4A. The output 23 of a variable frequency oscillator (VFO) 114 controls the sampling clock of a sampling device 24 which is typically an analog-to-digital converter (A/D) in digital read channels. A multiplexer 116 selects the unequalized sample values 25 during acquisition and the equalized sample values 32 during tracking, thereby removing the discrete equalizer 26 from the timing loop during acquisition in order to avoid its associated latency. A phase error detector 118 generates a phase error in response to the sample values received over line 120 and estimated sample values ~$Y_k$ from a sample value estimator 122, such as a slicer in a d=0 PR4 read channel, over line 124. A loop filter 126 filters the phase error to generate a frequency offset $\Delta f$ 128 that settles to a value proportional to a frequency difference between the sampling clock 23 and the baud rate of the recorded data. The frequency offset $\Delta f$ 128, together with the center frequency control signal 64 from the frequency synthesizer 52, adjust the sampling clock 23 at the output of the VFO 114 in order to synchronize the sampling to the baud rate.

A zero phase start 130 circuit suspends operation of the VFO 114 at the beginning of acquisition in order to minimize the initial phase error between the sampling clock 23 and the read signal 62. This is achieved by disabling the VFO 114, detecting a zero crossing in the analog read signal 62, and re-enabling the VFO 114 after a predetermined delay between the detected zero crossing and the first baud rate sample.

Interpolated Timing Recovery

Figure 4B:
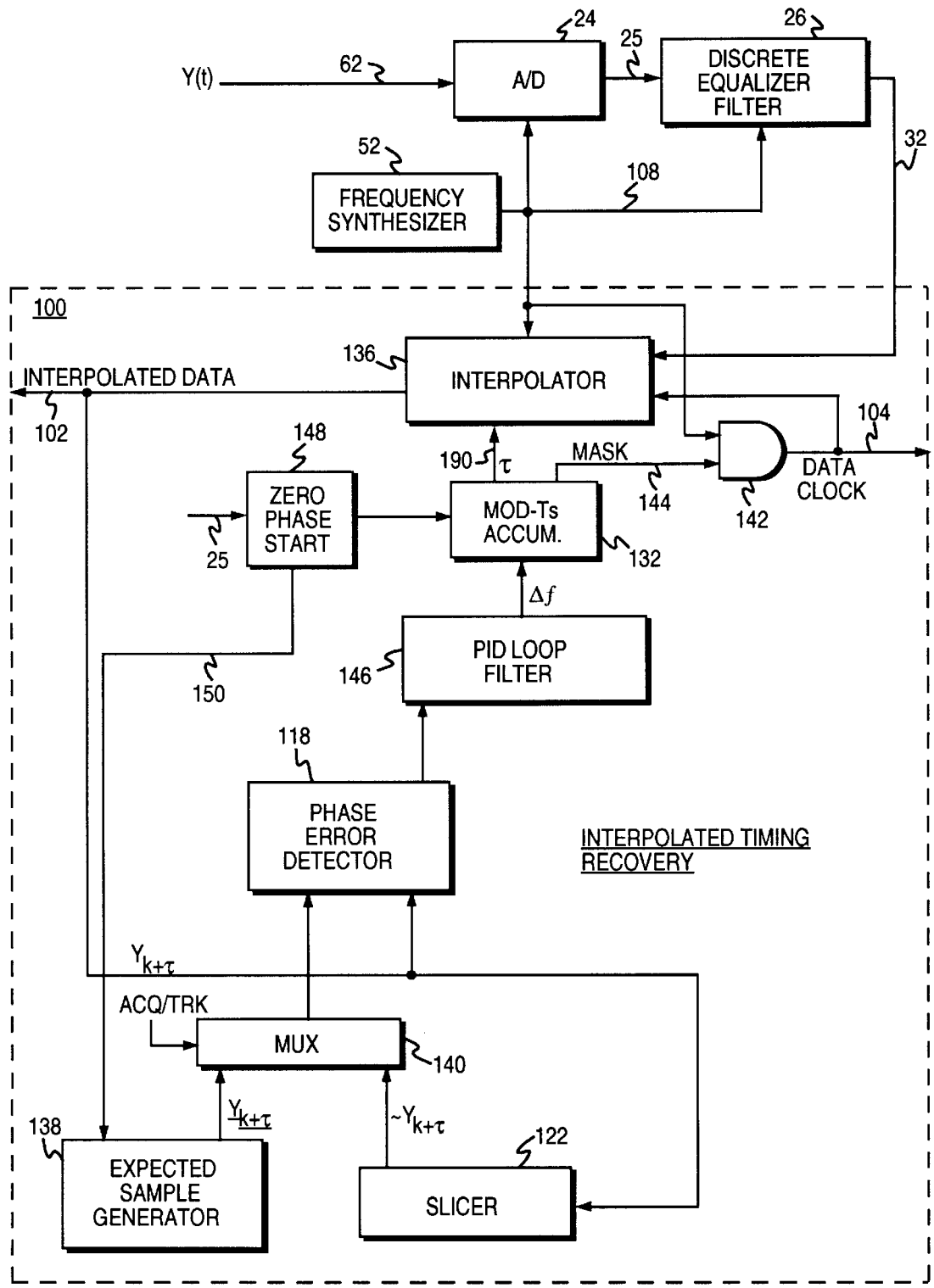
FIG. 4B is a detailed block diagram of the interpolating timing recovery (ITR) of the present invention comprising an interpolator for interpolating the asynchronous sample samples to generate synchronous sample values.

The interpolated timing recovery (ITR) 100 used in the sampled amplitude read channel of the present invention is shown in FIG. 4B. The VFO 114 in the conventional timing recovery of FIG. 4A is replaced with a modulo-$T_s$ accumulator 132 and an interpolator 136. In addition, an expected sample value generator 138 generates expected samples $Y_{k+\tau}$ used by the phase error detector 118 to compute the phase error during acquisition. A multiplexer 140 selects the estimated sample values ~$Y_{k+\tau}$ from the slicer 122 for use by the phase error detector 118 during tracking.

A data clock 104 is generated at the output of an AND gate 142 in response to the asynchronous sampling clock 108 generated by frequency synthesizer 52 and a mask signal 144 generated by the modulo-$T_s$ accumulator 132. Further details concerning the mask signal 144 are provided below with reference to FIG. 5. The phase error detector 118 and the slicer 122 process interpolated sample values 102 at the output of the interpolator 136 rather than the channel sample values 32 at the output of the discrete equalizer 26 as in FIG. 4A. A PID loop filter 146 controls the closed loop frequency response similar to the loop filter 126 of FIG. 4A.

In the ITR 100 of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer 26, together with their associated delays, have been removed from the timing recovery loop; it is not necessary to multiplex 116 around the discrete equalizer 26 between acquisition and tracking as in FIG. 4A. However, it is still necessary to acquire a preamble 68 before tracking the user data 72. To this end, a zero phase start (ZPR) circuit 148 minimizes the initial phase error between the interpolated sample values and the baud rate at the beginning of acquisition similar to the ZPR circuit 130 of FIG. 4A. However, rather than suspend operation of a sampling VFO 114, the ZPR circuit 148 for ITR 100 computes an initial phase error $\tau$ from the A/D 24 sample values 25 and loads this initial phase error into the mod-$T_s$ accumulator 132. The ZPR circuit 148 also generates a control signal over line 150 for initializing the expected sample generator 138 before beginning acquisition.

For more details concerning the ZPR circuit 148, refer to the above referenced U.S. patent application entitled "Zero Phase Restart for Interpolated Timing Recovery in a Sampled Amplitude Read Channel." For more details concerning the PID loop filter 146, phase error detector 118, expected sample generator 138, and slicer 122, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "Improved Timing Recovery For Synchronous Partial Response Recording." A detailed description of the modulo-$T_s$ accumulator 132, data clock 104, and interpolator 136 is provided in the following discussion.

Interpolator

Figure 5:
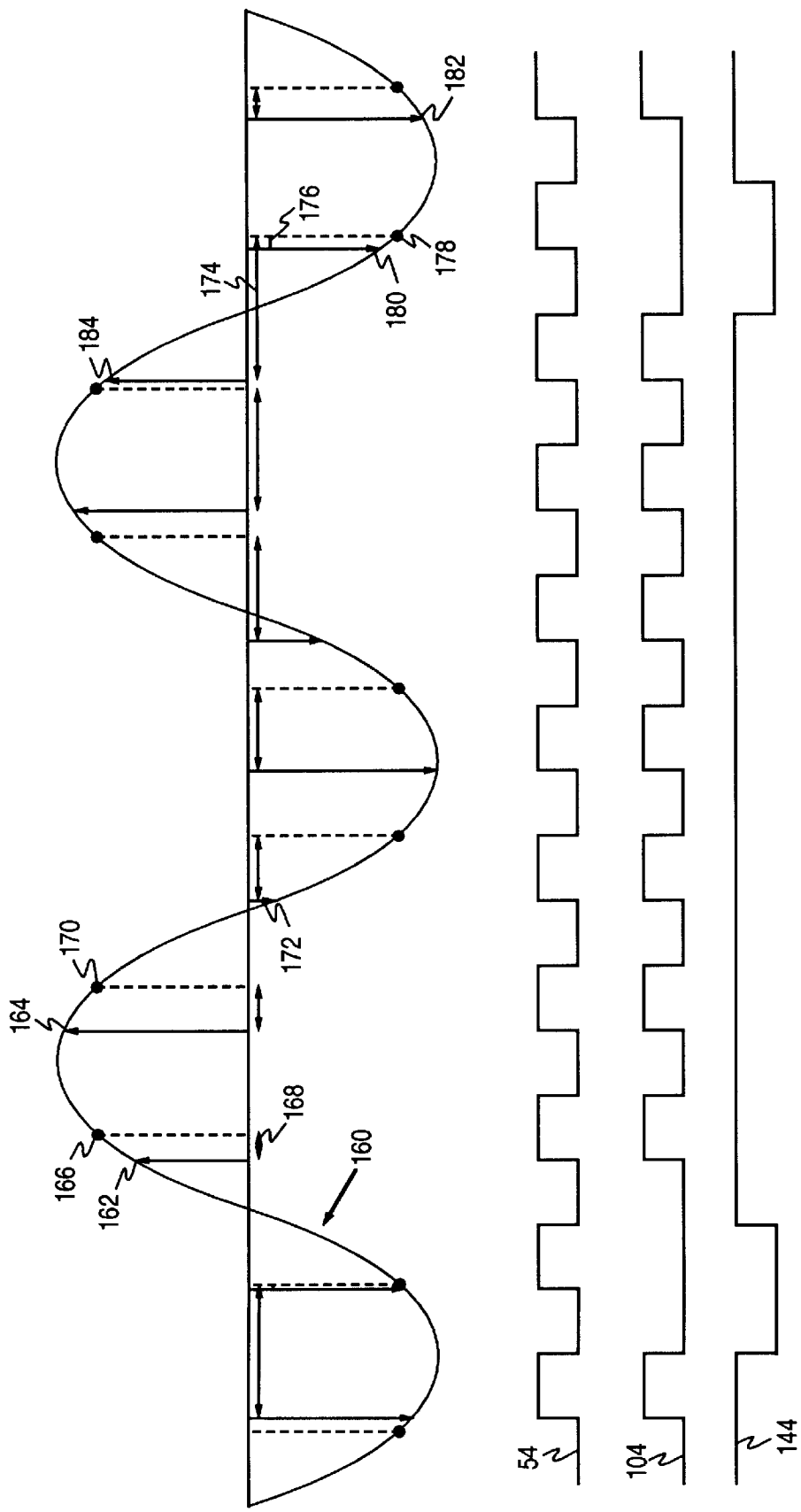
FIG. 5 illustrates the asynchronous channel samples in relation to the interpolated baud rate samples for the acquisition preamble.

The interpolator 136 of FIG. 4B is understood with reference to FIG. 5 which shows a sampled 2T acquisition preamble signal 160. The target synchronous sample values 102 are shown as black circles and the asynchronous channel sample values 32 as vertical arrows. Beneath the sampled preamble signal is a timing diagram depicting the corresponding timing signals for the sampling clock 54, the data clock 104 and the mask signal 144. As can be seen in FIG. 5, the preamble signal 160 is sampled slightly faster than the baud rate (the rate of the target values). This small amount of over sampling helps to attenuate noise due to aliasing around Nyquist, and it is also used to generate the data clock 104.

The function of the interpolator is to estimate the target sample value by interpolating the channel sample values. For illustrative purposes, consider a simple estimation algorithm, linear interpolation:

$$Y(N-1) = x(N-1) + \tau \cdot (x(N) - x(N-1)) \tag{1}$$

where $x(N-1)$ and $x(N)$ are the channel samples surrounding the target sample, and $\tau$ is an interpolation interval proportional to a time difference between the channel sample value $x(N-1)$ and the target sample value. The interpolation interval $\tau$ 190 is generated at the output of modulo-Ts accumulator 132 which accumulates the frequency offset signal $\Delta f$ at the output of the PID loop filter 146:

$$\tau = \left(\sum \Delta f\right) MOD\ TS \tag{2}$$

where Ts is the sampling period of the sampling clock 108. Since the sampling clock 108 samples the analog read signal 62 slightly faster than the baud rate, it is necessary to mask the data clock every time the accumulated frequency offset $\Delta f$, integer divided by Ts, increments by 1. Operation of the data clock 104 and the mask signal 144 generated by the mod-$T_s$ accumulator 132 is understood with reference to the timing diagram of FIG. 5.

Assuming the interpolator implements the simple linear equation (1) above, then channel sample values 162 and 164 are used to generate the interpolated sample value corresponding to target sample value 166. The interpolation interval $\tau$ 168 is generated according to equation (2) above. The next interpolated sample value corresponding to the next target value 170 is computed from channel sample values 164 and 172. This process continues until the interpolation interval $\tau$ 174 would be greater than Ts except that it "wraps" around and is actually $\tau$ 176 (i.e., the accumulated frequency offset $\Delta f$, integer divided by Ts, increments by 1 causing the mask signal 144 to activate). At this point, the data clock 104 is masked by mask signal 144 so that the interpolated sample value corresponding to the target sample value 178 is computed from channel sample values 180 and 182 rather than channel sample values 184 and 180.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator 136 of FIG. 4B is implemented as a filter responsive to more than two channel samples to compute the interpolated sample value.

The ideal discrete-time phase interpolation filter has a flat magnitude response and a constant group delay of $\tau$:

$$C_\tau(e^{j\omega}) = e^{j\omega\tau} \tag{3}$$

which has an ideal impulse response:

$$\mathrm{sinc}(\pi \cdot (n - \tau/T_s)) \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \tag{5}$$

where $\overline{C}_\tau(e^{j\omega})$ is the spectrum of the actual interpolation filter, and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega \tag{6}$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n) e^{-j\omega n} \tag{8}$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n)e^{-j\omega n} - e^{j\omega\tau} \right|^2 |X(e^{j\omega})|^2 d\omega. \qquad (9)$$

The next step is to take the derivatives of equation (9) with respect to the coefficients $C_\tau(n)$ and set them to zero:

$$\frac{\partial E_{\tau,\alpha}^2}{\partial C_\tau(n_o)} = 0 \quad \text{for } n_o = -R, \ldots, 0, 1, \ldots, R-1. \qquad (10)$$

After careful manipulation, equation (10) leads to:

$$\int_{-\alpha\pi}^{\alpha\pi} \left[ \left( \sum_{n=-R}^{n=R-1} C_\tau(n)\cos(\omega(n_o - n)) \right) - \cos(\omega(n_o + \tau)) \right] |X(e^{j\omega})|^2 d\omega = 0 \qquad (11)$$

for $n_0 = -R, \ldots, 0, 1, \ldots, R-1$.
Defining $\phi(r)$ as:

$$\phi(r) = \int_{-\alpha\pi}^{\alpha\pi} |X(e^{j\omega})|^2 \cos(\omega r) d\omega \qquad (12)$$

and substituting equation (12) into equation (11) gives:

$$\sum_{n=-R}^{n=R-1} C_\tau(n)\phi(n - n_o) = \phi(n_o + \tau) \qquad (13)$$

for $n_o = -R, \ldots, 0, 1, \ldots, R-1$.

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [c_\tau(-R), \ldots, c_\tau(0), \ldots, c_\tau(R-1)]^t$$

$\Phi_T$ is a Toeplitz matrix of the form:

$$\Phi_T = \begin{bmatrix} \phi(0) & \phi(1) & \cdots & \phi(2R-1) \\ \phi(1) & \phi(0) & & \\ \vdots & & & \vdots \\ \phi(2R-1) & & \cdots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \qquad (14)$$

The solution to equation (14) is:

$$C_\tau = \Phi_T^{-1} \Phi_\tau \qquad (15)$$

where $\Phi_T^{-1}$ is an inverse matrix that can be solved using well known methods.

Table 2 shows example coefficients $C_\tau(n)$ calculated from equation (15) with 2R=6, $\alpha$=0.8 and $X(e^{j\omega})$=PR4:

TABLE 2

| $\tau_s \cdot 32/T_s$ | C(−2) | C(−1) | C(0) | C(1) | C(2) | C(3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

Figure 6:
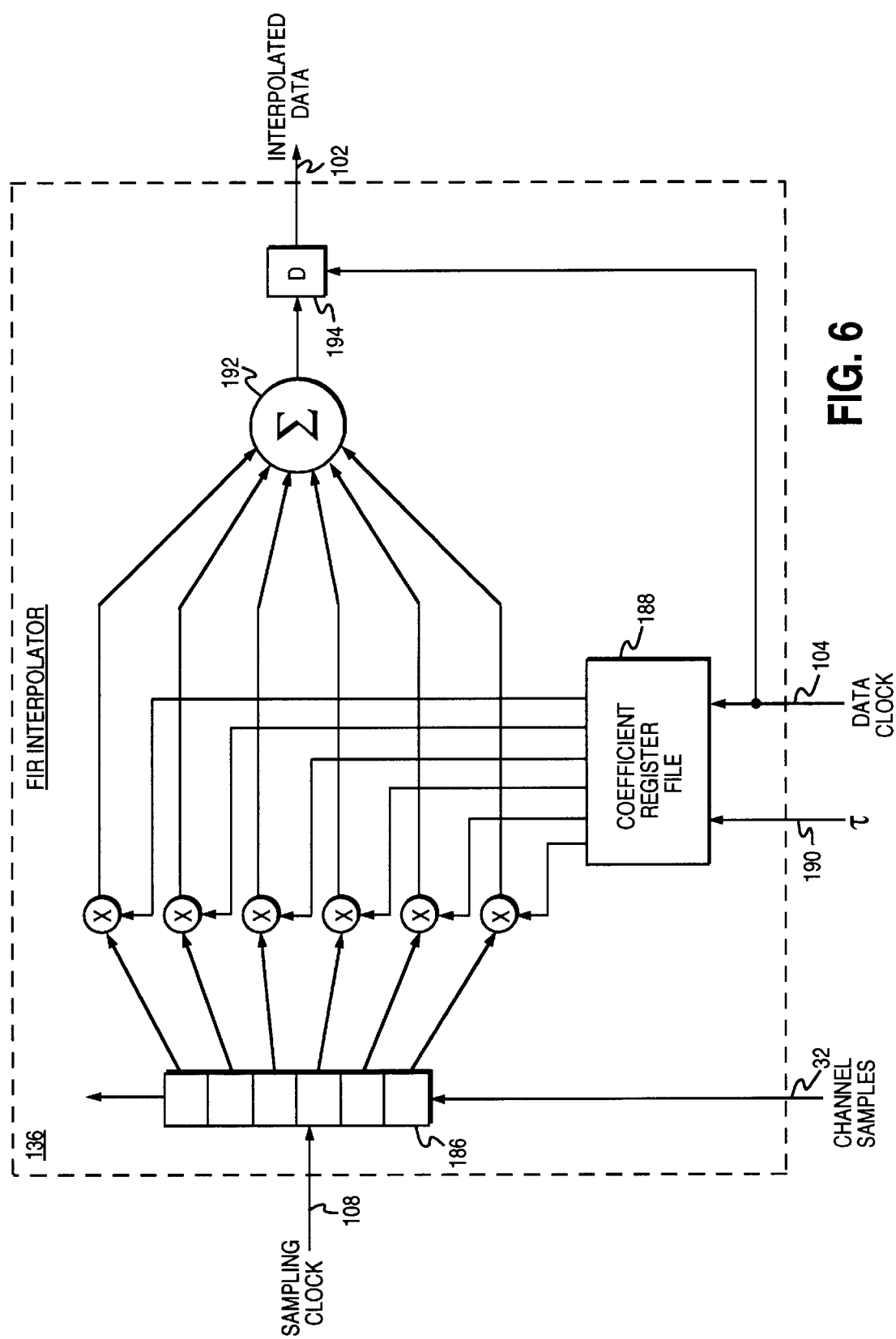
FIG. 6 shows an FIR filter implementation for the ITR interpolator.

FIG. 6 shows an implementation of a six tap FIR filter which operates according to the coefficients shown in Table 2. A shift register 186 receives the channel samples 32 at the sampling clock rate 108. The filter coefficients $C_\tau(n)$ are stored in a coefficient register file 188 and applied to corresponding multipliers according to the current value of $\tau$ 190. The coefficients are multiplied by the channel samples 32 stored in the shift register 186. The resulting products are summed 192 and the sum stored in a delay register 194. The coefficient register file 188 and the delay register 194 are clocked by the data clock 104 to implement the masking function described above.

Asynchronous/Synchronous Gain Error Circuit

Figure 7:
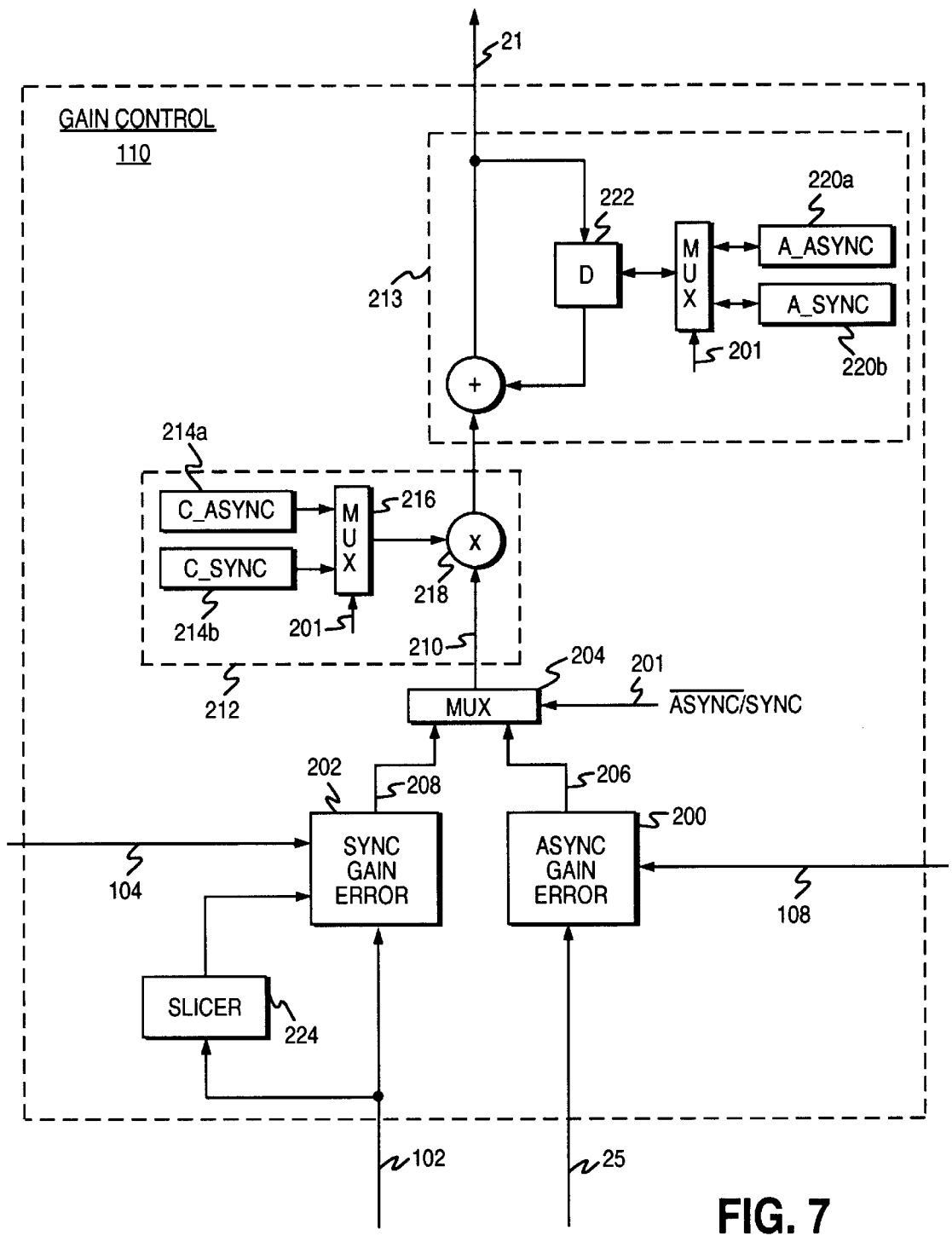
FIG. 7 is a block diagram of the gain control circuit according to one embodiment of the present invention which comprises an asynchronous gain error detector for use during acquisition, and a synchronous gain error detector for use during tracking.

FIG. 7 is a block diagram of the asynchronous/synchronous gain control circuit 110 according to one embodiment of the present invention. In this embodiment, the gain error detectors 200 and 202 operate on digital sample values output by the sampling device 24 (an analog-to-digital converter) and ITR 100. The asynchronous gain error detector 200 processes the asynchronous sample values 25 (as clocked by the sampling clock 108), and the synchronous gain error detector 202 processes the synchronous, interpolated sample values 102 (as clocked by the data clock 104). An $\overline{\text{async}}$/sync control signal 201 selects through multiplexer 204 gain error 206 from the asynchronous gain error detector 200 during seeking, and gain error 208 from the synchronous gain error detector 202 during tracking. The gain error 210 selected through multiplexer 204 is filtered by an integrating filter implemented by a digital coefficient multiplier circuit 212 and a digital accumulator circuit 213.

The digital multiplier circuit 212 comprises a first register C_ASYNC 214a for storing a first programmable multiplier coefficient corresponding to the asynchronous mode, and a second register C_SYNC 214b for storing a second programmable coefficient corresponding to the synchronous mode. The async/sync control line 201 selects through multiplexer 216 the appropriate multiplier coefficient as the input to the gain error multiplier 218. The optimum values for the programmable coefficients are determined for each zone when the read channel is calibrated.

Similar to the multiplier circuit 212, the accumulator circuit 213 comprises a first and second register 220a and 220b for storing a programmable value corresponding to the asynchronous or synchronous mode. The digital values stored in these registers are used to initialize the accumulator register 222 when the recording head transfers into a new zone. After reading the acquisition preamble 68 (FIG. 2B) during a read operation, the current value of the accumulator register 222 is saved in the A_ASYNC register 220a for use during the next read operation. Similarly, after reading the user data field 72, the current value of the accumulator register 222 is saved in the A_SYNC register 220b for use during the next read. The initial values for the accumulator registers 220a and 220b for each zone are determined when the read channel is calibrated.

As described above, the motivation for an asynchronous gain error detector is to minimize the transport delay in the gain control loop during acquisition by removing the delays associated with the discrete equalizer filter 26 and the timing recovery interpolation filter 136. This allows for a wider gain loop bandwidth which decreases the acquisition time and the length of the acquisition preamble. Thus, during acquisition the gain error is computed from the asynchronous sample values 25 output by the sampling device 24. There are two alternative embodiments for implementing the asynchronous gain error detector 200 of FIG. 7.

In a first embodiment, the asynchronous gain error detector 200 computes the gain error 206 by taking the discrete-time fourier transform (DTFT) of the asynchronous sample values 25 of the analog read signal. Preferably, the acquisition preamble 68 is a periodic pattern of bits which results in a substantially sinusoidal signal upon read back. If the acquisition preamble is a 2T pattern (i.e., a write current pattern 16 of +1,+1,−1,−1,+1,+1), then the read back signal is a sine wave with frequency $f_B/4$, where $f_B$ is the recording rate (baud rate). The magnitude of the DTFT at this frequency is defined for any four consecutive samples as:

$$\pi/2 \cdot ((X_0-X_2)^2+(X_1-X_3)^2)^{1/2}$$

where $X_n$ are the discrete-time, asynchronous sample values of the analog read signal. To generate the gain error, it is not actually necessary to compute the square root or to multiply by $\pi/2$ in the above equation. Thus the discrete time gain error can be computed simply as:

$$(X_0-X_2)^2+(X_1-X_3)^2-\text{set\_point}$$

where "set_point" is a constant representing the target gain for the read signal. The constant "set_point" can be selected slightly different than the optimum value for the desired partial response so as to attenuate any transient in switching between the asynchronous and synchronous modes of operation.

In the second embodiment of the present invention, the gain error 206 is computed from the asynchronous sample values 25 by subtracting a target set point from the average energy in the read signal. The average energy for a 2T acquisition preamble can be computed simply as:

$$X_0^2+X_1^2$$

and the gain error computed as:

$$(X_0^2-g)+(X_1^2-g)$$

where $X_0$ and $X_1$ are asynchronous sample values 25 of the analog read signal and g is the target gain. Again, g can be selected slightly different than the optimum value for the desired partial response so as to attenuate any transient in switching between the asynchronous and synchronous modes of operation.

Once the nominal amplitude has been acquired and the read channel begins to track the user data, the bandwidth of the gain control circuit is reduced to attenuate gain variance due to the randomness of the user data. Consequently, the delays associated with the discrete equalizer 26 and timing recovery interpolation filter 136 are not a significant factor during tracking, and the gain error can be computed from the synchronous, interpolated sample values 102 using a more effective tracking gain error equation:

$$\text{sgn}(X_0)(X_0-\sim X_0)+\text{sgn}(X_1)(X_1-\sim X_1)$$

where sgn(x) returns the sign of x and zero if x is zero, $X_0$ and $X_1$ are synchronous, interpolated sample values 102 of the analog read signal, and $\sim X_0$ and $\sim X_1$ are estimated sample values corresponding to ideal target gain values.

In the preferred embodiment, the read channel is equalized according to a PR4 response, and the estimated sample values $\sim X_0$ and $\sim X_1$ in the above synchronous gain error equation are generated by a simple slicer circuit 224 (shown in FIG. 7) which compares the synchronous sample value 102 to positive and negative thresholds according to Table 3:

TABLE 3

| Sample Value | Slicer Output |
|---|---|
| y >= T1 | +1 |
| −T2 <= y < T1 | 0 |
| y < −T2 | −1 |

In Table 3, y is the synchronous sample value 102 and T1 and −T2 are the positive and negative thresholds, respectively. The slicer output shown in Table 3 assumes that the positive and negative pulses in the analog read signal are symmetric. This, however, may not be the case, especially when a magnetoresistive (MR) read head is employed. Thus, to compensate for asymmetries in the analog read signal, the slicer can be programmed to output slightly different values to account for the asymmetries. Similarly, the programmable thresholds T1 and −T2 can be set to values that compensate for the asymmetries. The optimum values for the slicer output and the thresholds T1 and −T2 are determined for each zone when the read channel is calibrated.

Figure 8:
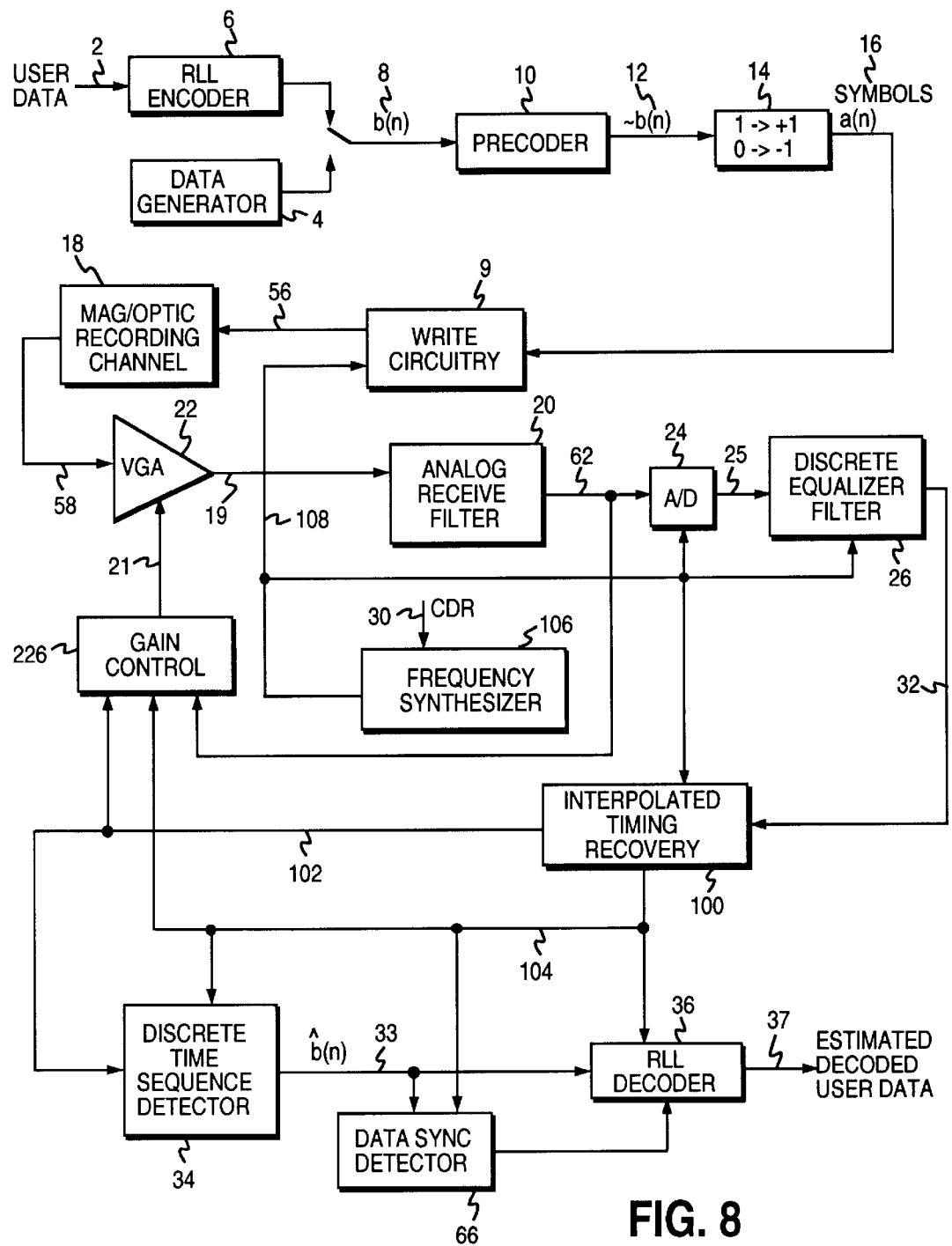
FIG. 8 shows an alternative embodiment for the sampled amplitude read channel of the present invention, wherein the asynchronous gain error is generated during acquisition directly from the analog read signal.

An alternative embodiment of the sampled amplitude read channel of the present invention is shown in FIG. 8. In this embodiment, the gain control circuit 226 is responsive to the analog read signal 62 at the output of the analog receive filter 20 as opposed to the asynchronous sample values 25 at the output of the sampling device. That is, the asynchronous gain error is computed during acquisition from the analog read signal 62. In this manner, the delay of the sampling device 24 is also removed from the gain control loop allowing for an even wider bandwidth and faster acquisition times. Furthermore, the cost and complexity of the sampling device 24 (e.g., an analog-to-digital converter 24) can be reduced by implementing it with pipelined stages. Since the gain error is computed from the analog read signal 62 during acquisition, the above asynchronous gain error equations are implemented using analog circuits which is within the ability of those skilled in the art. In addition, the gain control circuit 226 of FIG. 8 comprises an analog filter for filtering the analog gain error during acquisition, and a discrete-time filter for filtering the gain error while tracking the user data. An alternative embodiment to that shown in FIG. 8 would be to compute the asynchronous gain error during acquisition from the analog signal 19 at the output of the VGA 22, thereby avoiding the delay of the analog receive filter 20.

Figure 9:
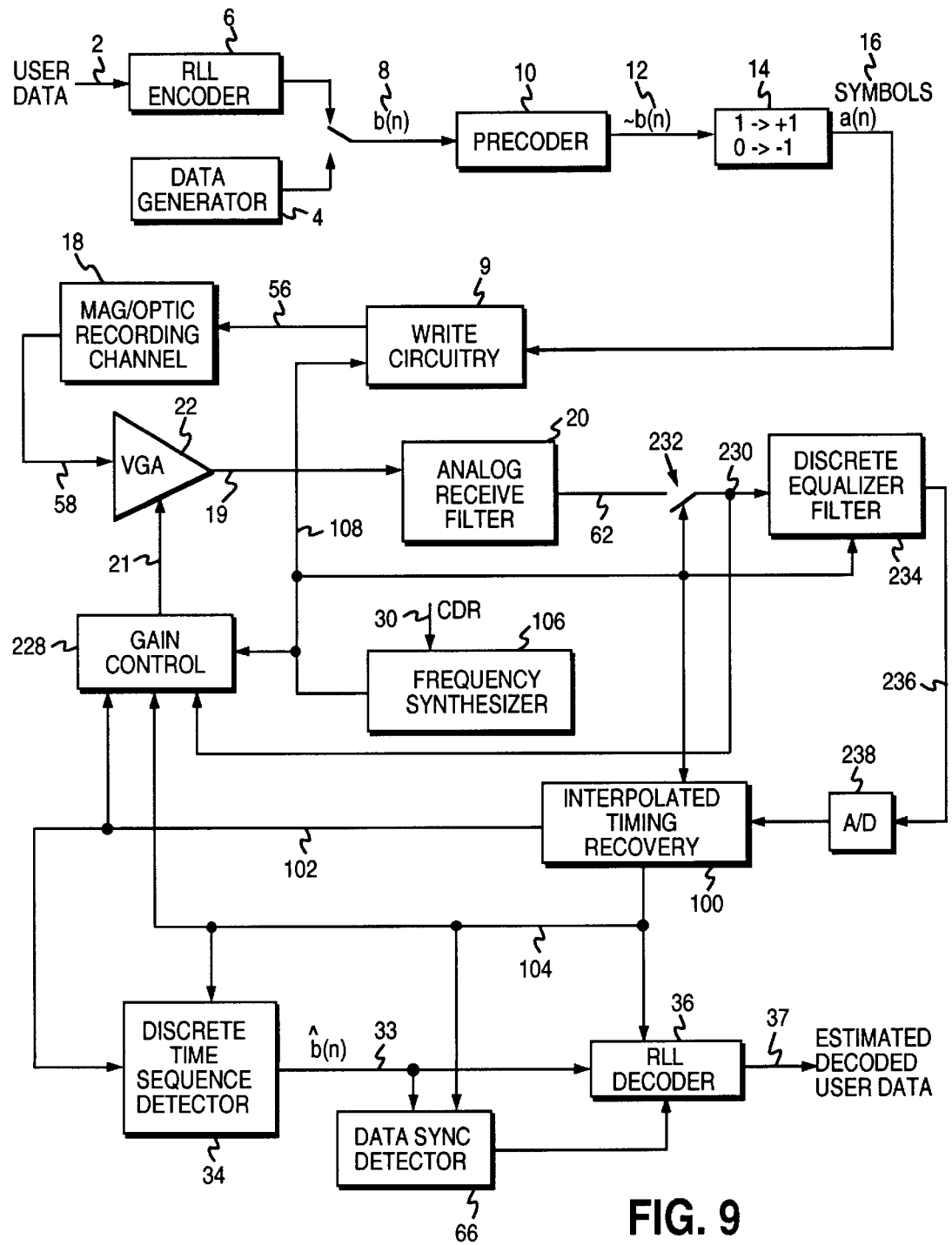
FIG. 9 shows yet another alternative embodiment for the sampled amplitude read channel of the present invention, wherein the asynchronous gain error detector and discrete time equalizer process discrete-time analog (DTA) sample values as opposed to digital sample values.

In yet another alternative embodiment shown in FIG. 9, the gain control circuit 228 is responsive to asynchronous, discrete-time analog (DTA) sample values 230 output by the sampling device 232 (e.g., a sample and hold circuit 232). The discrete equalizer filter 234 is implemented using DTA components, and the equalized DTA samples 236 are then converted to digital values by an analog-to-digital (A/D) converter 238. Similar to FIG. 8, this implementation removes the delay associated with the A/D 238 which allows for a wider gain loop bandwidth and reduces the cost and complexity of the A/D converter 238. The asynchronous gain error equations described above are implemented using DTA techniques, and the gain control circuit 228 comprises a DTA filter and a digital filter for filtering the gain error during acquisition and tracking, respectively. Implementing the asynchronous gain error equations and filter using DTA circuits is within the ability of those skilled in the art.

Figure 10:
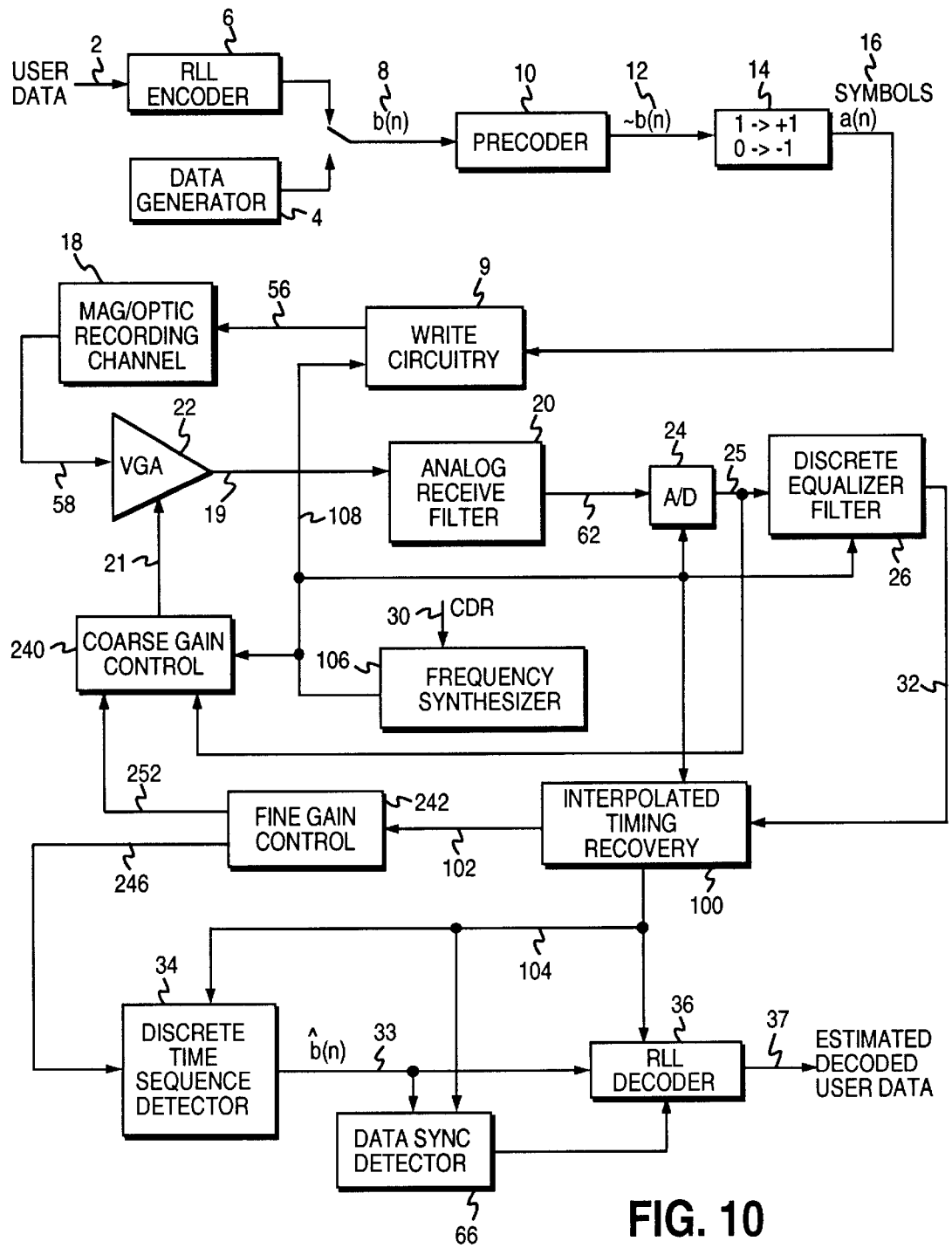
FIG. 10 shows still another alternative embodiment for the sampled amplitude read channel of the present invention which comprises a coarse gain control circuit for adjusting the amplitude of the analog read signal to be within the optimal operating range of the sampling device, and a wholly-digital fine gain control circuit for adjusting the amplitude of the synchronous, interpolated sample values toward the desired partial response.

FIG. 10 shows another embodiment of the sampled amplitude read channel of the present invention. This embodiment uses a coarse gain control circuit 240 for controlling the gain of the analog read signal 19 at the output of the VGA 22 during both acquisition and tracking in order to keep the analog read signal 62 within the optimum operating range of the sampling device 24, and a fine gain control circuit 242 for adjusting the magnitude of the synchronous, interpolated sample values 102 toward the desired partial response during tracking. The coarse gain control circuit 240 generates the VGA control signal 21 during acquisition according to the above described asynchronous gain error equation using the asynchronous sample values 25 output by the sampling device 24. Similar to the embodiment shown in FIG. 3, the delays associated with the discrete equalizer 26 and timing recovery interpolation filter 136 have been removed from the gain control loop, thereby allowing a wider gain loop bandwidth and shorter acquisition preambles.

Figure 11:
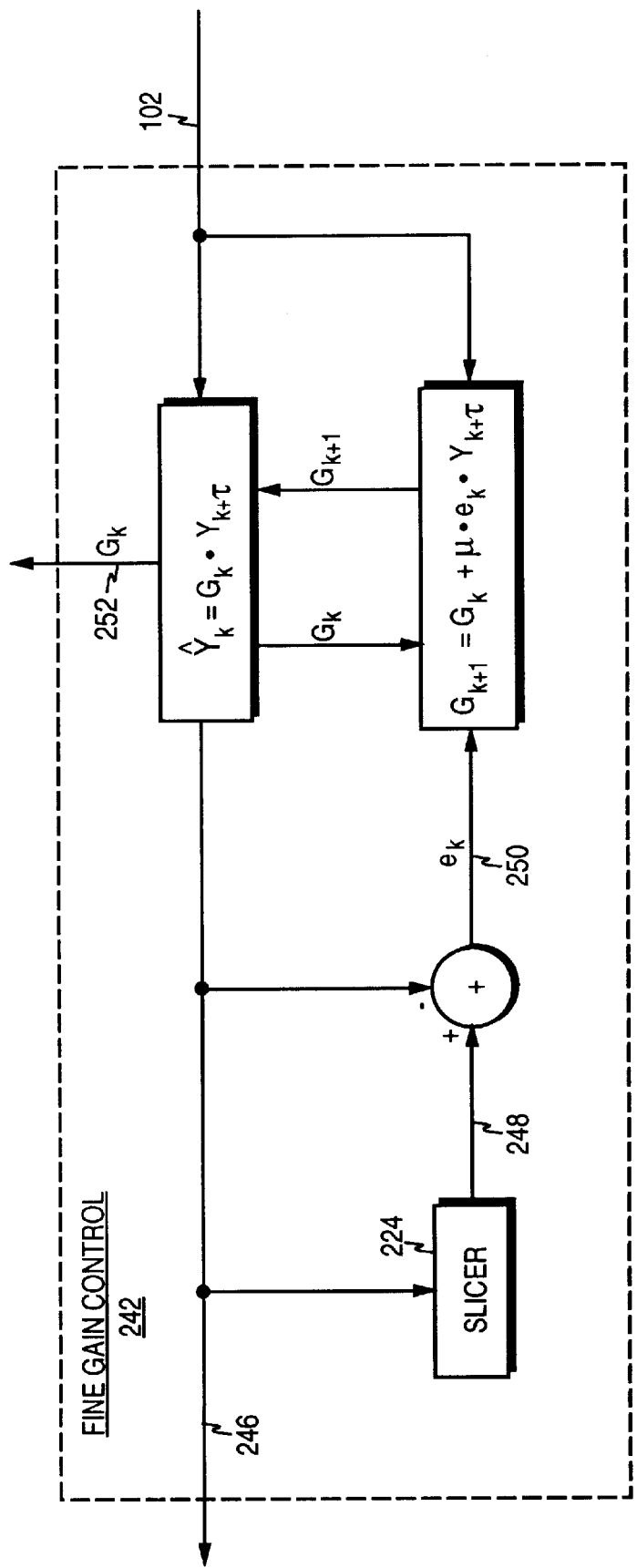
FIG. 11 is a block diagram of the wholly-digital fine gain control circuit of FIG. 10 which is updated according to a least mean square (LMS) algorithm.

Details of the fine gain control circuit 242 of FIG. 10 are shown in FIG. 11. Basically, the fine gain control circuit 242 operates similar to an adaptive filter with a single coefficient, $G_k$, which is updated according to a least mean square (LMS) algorithm. The synchronous, interpolated sample values $Y_{k+\tau}$ 102 are multiplied by the gain coefficient $G_k$ to generate an amplitude modified synchronous sample value $\hat{Y}_k$ 246. The modified synchronous sample values $\hat{Y}_k$ 246 are subtracted from estimated sample values 248 generated by a slicer 224 (described above) to generate a sample error value $e_k$ 250. The sample error value $e_k$ 250 is then used to update the gain coefficient $G_{k+1}$ according to the well known LMS equation:

$$G_{k+1} = G_k + \mu \cdot e_k \cdot Y_{k+\tau}$$

where $\mu$ is a predetermined gain. Thus, the fine gain control circuit is a closed-loop feedback system that attempts to match the magnitude of the synchronous sample values $\hat{Y}_k$ 246 to the desired partial response. The partial response sample values $\hat{Y}_k$ 246 are then processed by the discrete time sequence detector 34 (e.g., Viterbi detector) to detect the estimated binary sequence $\hat{b}(n)$ 33.

During tracking, the asynchronous gain error detector in the coarse gain control circuit 240 is disabled because it cannot track the gain error over random user data. However, the coefficient $G_k$ in the fine gain control circuit 242 is input into the coarse gain control circuit 240 over line 252 during tracking and used to prevent the amplitude of the analog read signal 62 from drifting away from the optimum operating range of the sampling device 24. This is accomplished by adjusting the coarse gain error such that the fine gain error coefficient $G_k$ remains within predetermined positive and negative maximum values.

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed by the following claims.

What is claimed is:

1. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:

(a) a variable gain amplifier (VGA) for adjusting an amplitude of the analog read signal before sampling;

(b) a sampling device for sampling the analog read signal asynchronous to the baud rate of the recorded data to generate asynchronous sample values;

(c) an interpolated timing recovery circuit, responsive to the asynchronous sample values, for generating synchronous sample values substantially synchronized to the baud rate of the recorded data;

(d) an asynchronous gain control circuit for generating an asynchronous gain error from the asynchronous sample values by computing a discrete-time fourier transform (DTFT) of the asynchronous sample values to estimate a magnitude of the analog read signal at the output of the VGA, the asynchronous gain error for controlling operation of the VGA when the read channel is reading the acquisition preamble in order to synchronize the interpolated timing recovery circuit to the baud rate of the recorded data during a read operation;

(e) a synchronous gain control circuit for generating a synchronous gain error from the synchronous sample values, the synchronous gain error for controlling operation of the VGA when the read channel is reading the user data field; and (f) a discrete-time sequence detector for detecting the recorded data from the synchronous sample values.

2. The sampled amplitude read channel as recited in claim 1, wherein:
   (a) the acquisition preamble is approximately a sine wave with a frequency one-fourth of the baud rate; and
   (b) the DTFT estimates the magnitude of the analog read signal according to:

$$(X_0-X_2)^2+(X_1-X_3)$$

where $X_n$ are the asynchronous sample values of the analog read signal.

3. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble, being approximately a sine wave with a frequency one-fourth of the baud rate, preceding a user data field, the sampled amplitude read channel comprising:
   (a) a variable gain amplifier (VGA) for adjusting an amplitude of the analog read signal before sampling;
   (b) a sampling device for sampling the analog read signal asynchronous to the baud rate of the recorded data to generate asynchronous sample values;
   (c) an interpolated timing recovery circuit, responsive to the asynchronous sample values, for generating synchronous sample values substantially synchronized to the baud rate of the recorded data;
   (d) an asynchronous gain error detector for generating an asynchronous gain error from asynchronous sample values of the analog read signal output by the sampling device, wherein:
      the asynchronous gain error controls the VGA when the read channel is reading the acquisition preamble in order to synchronize the interpolated timing recovery circuit to the baud rate of the recorded data during a read operation; and
      the asynchronous gain control circuit generates the asynchronous gain error by computing a discrete-time fourier transform (DTFT) of the asynchronous sample values to estimate a magnitude of the analog read signal at the output of the VGA according to:

$$(X_0-X_2)^2+(X_1-X_3)$$

where $X_1$ are the asynchronous sample values of the analog read signal;
   (e) a synchronous gain error detector for generating a synchronous gain error from the synchronous sample values of the analog read signal output by the interpolated timing recovery circuit, the synchronous gain error for controlling the VGA when the read channel is reading the user data field; and
   (f) a discrete-time sequence detector for detecting the recorded data from the synchronous sample values.

4. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:
   (a) a variable gain amplifier (VGA) for adjusting an amplitude of the analog read signal before sampling;
   (b) a sampling device for sampling the analog read signal asynchronous to the baud rate of the recorded data to generate asynchronous sample values;
   (c) an interpolated timing recovery circuit, responsive to the asynchronous sample values, for generating synchronous sample values substantially synchronized to the baud rate of the recorded data;
   (d) an asynchronous gain control circuit for generating an asynchronous gain error from the asynchronous sample values according to:

$$(X_0^2-g)+(X_1^2-g)$$

where $X_0$ and $X_1$ are the asynchronous sample values of the analog read signal and g is a predetermined gain set point, the asynchronous gain error for controlling operation of the VGA when the read channel is reading the acquisition preamble in order to synchronize the interpolated timing recovery circuit to the baud rate of the recorded data during a read operation;
   (e) a synchronous gain control circuit for generating a synchronous gain error from the synchronous sample values, the synchronous gain error for controlling operation of the VGA when the read channel is reading the user data field; and
   (f) a discrete-time sequence detector for detecting the recorded data from the synchronous sample values.

5. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:
   (a) a variable gain amplifier (VGA) for adjusting an amplitude of the analog read signal before sampling;
   (b) a sampling device for sampling the analog read signal asynchronous to the baud rate of the recorded data to generate asynchronous sample values;
   (c) an interpolated timing recovery circuit, responsive to the asynchronous sample values, for generating synchronous sample values substantially synchronized to the baud rate of the recorded data
   (d) an asynchronous gain control circuit for generating an asynchronous gain error from the asynchronous sample values, the asynchronous gain error for controlling operation of the VGA when the read channel is reading the acquisition preamble in order to synchronize the interpolated timing recovery circuit to the baud rate of the recorded data during a read operation;
   (e) a synchronous gain control circuit for generating a synchronous gain error from the synchronous sample values according to:

$$\operatorname{sgn}(X_0)(X_0-\sim X_0)+\operatorname{sgn}(X_1)(X_1-\sim X_1)$$

where sgn(x) returns the sign of x and zero if x is zero, $X_0$ and $X_1$ are synchronous, interpolated sample values of the analog read signal, and $\sim X_0$ and $\sim X_1$ are estimated sample values corresponding to ideal target gain values, the synchronous gain error for controlling operation of the VGA when the read channel is reading the user data field; and (f) a discrete-time sequence detector for detecting the recorded data from the synchronous sample values.

6. The sampled amplitude read channel as recited in claim 5, wherein the estimated sample values ~$X_0$ and ~$X_1$ are programmable to compensate for asymmetries in the analog read signal.

7. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:

(a) a variable gain amplifier (VGA) for adjusting an amplitude of the analog read signal before sampling;

(b) a sampling device for sampling the analog read signal asynchronous to the baud rate of the recorded data to generate asynchronous sample values;

(c) an interpolated timing recovery circuit, responsive to the asynchronous sample values, for generating synchronous sample values substantially synchronized to the baud rate of the recorded data;

(d) an asynchronous gain control circuit for generating an asynchronous gain error from the asynchronous sample values, the asynchronous gain error for controlling operation of the VGA when the read channel is reading the acquisition preamble in order to synchronize the interpolated timing recovery circuit to the baud rate of the recorded data during a read operation;

(e) a synchronous gain control circuit for generating a synchronous gain error from the synchronous sample values, the synchronous gain error for controlling operation of the VGA when the read channel is reading the user data field; and (f) a discrete-time sequence detector for detecting the recorded data from the synchronous sample values; wherein:

(g) the asynchronous gain control circuit and the synchronous gain control circuit share circuitry; and (h) the read channel comprises a means for configuring the shared circuitry according to whether the read channel is reading the acquisition preamble or the user data field.

8. The sampled amplitude read channel as recited in claim 7, wherein the shared circuitry comprises a discrete-time integrating filter.

9. The sampled amplitude read channel as recited in claim 8, wherein:

(a) the discrete-time integrating filter comprises a programmable multiplier coefficient;

(b) the means for configuring the shared circuitry comprises a means for programming the multiplier coefficient with a value corresponding to whether the read channel is reading the acquisition preamble or the user data field.

10. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:

(a) a variable gain amplifier (VGA) for adjusting an amplitude of the analog read signal before sampling;

(b) a sampling device for sampling the analog read signal asynchronous to the baud rate of the recorded data to generate asynchronous sample values;

(c) an interpolated timing recovery circuit, responsive to the asynchronous sample values, for generating synchronous sample values substantially synchronized to the baud rate of the recorded data;

(d) an asynchronous gain control circuit for generating an asynchronous gain error from the asynchronous sample values, the asynchronous gain control circuit comprising a transient attenuator for attenuating any transient in the gain error when transitioning between reading the acquisition preamble and the user data field, the asynchronous gain error for controlling operation of the VGA when the read channel is reading the acquisition preamble in order to synchronize the interpolated timing recovery circuit to the baud rate of the recorded data during a read operation;

(e) a synchronous gain control circuit for generating a synchronous gain error from the synchronous sample values, the synchronous gain error for controlling operation of the VGA when the read channel is reading the user data field; and (f) a discrete-time sequence detector for detecting the recorded data from the synchronous sample values.

11. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:

(a) a variable gain amplifier (VGA) for adjusting an amplitude of the analog read signal before sampling;

(b) a sampling device for sampling the analog read signal asynchronous to the baud rate of the recorded data to generate asynchronous sample values;

(c) an interpolated timing recovery circuit, responsive to the asynchronous sample values, for generating synchronous sample values substantially synchronized to the baud rate of the recorded data;

(d) an asynchronous gain error detector for generating an asynchronous gain error from asynchronous sample values of the analog read signal output by the sampling device according to:

$$(X_0^2-g)+(X_1^2-g)$$

where $X_0$ and $X_1$ are the asynchronous sample values of the analog read signal and g is a predetermined gain set point, wherein:

the asynchronous gain error controls the VGA when the read channel is reading the acquisition preamble in order to synchronize the interpolated timing recovery circuit to the baud rate of the recorded data during a read operation; and the asynchronous gain control circuit generates the asynchronous gain error by computing a discrete-time fourier transform (DTFT) of the asynchronous sample values to estimate a magnitude of the analog read signal at the output of the VGA;

(e) a synchronous gain error detector for generating a synchronous gain error from the synchronous sample values of the analog read signal output by the interpolated timing recovery circuit, the synchronous gain error for controlling the VGA when the read channel is reading the user data field; and (f) a discrete-time sequence detector for detecting the recorded data from the synchronous sample values.

12. A sampled amplitude read channel for reading data recorded on a disk storage medium at a predetermined baud rate by detecting an estimated data sequence from discrete-time sample values generated by sampling an analog read signal from a read head positioned over the disk storage medium, the recorded data comprising data sectors comprised of an acquisition preamble preceding a user data field, the sampled amplitude read channel comprising:

(a) a variable gain amplifier (VGA) for adjusting an amplitude of the analog read signal before sampling;

(b) a sampling device for sampling the analog read signal asynchronous to the baud rate of the recorded data to generate asynchronous sample values;

(c) an interpolated timing recovery circuit, responsive to the asynchronous sample values, for generating synchronous sample values substantially synchronized to the baud rate of the recorded data;

(d) an asynchronous gain error detector for generating an asynchronous gain error from asynchronous sample values of the analog read signal output by the sampling device, wherein:

the asynchronous gain error controls the VGA when the read channel is reading the acquisition preamble in order to synchronize the interpolated timing recovery circuit to the baud rate of the recorded data during a read operation; and the asynchronous gain control circuit generates the asynchronous gain error by computing a discrete-time fourier transform (DTFT) of the asynchronous sample values to estimate a magnitude of the analog read signal at the output of the VGA;

(e) a synchronous gain error detector for generating a synchronous gain error from the synchronous sample values of the analog read signal output by the interpolated timing recovery circuit according to:

$$\text{sgn}(X_0)(X_0 - \sim X_0) + \text{sgn}(X_1)(X_1 - \sim X_1)$$

where sgn(x) returns the sign of x and zero if x is zero, $X_0$ and $X_1$ are synchronous, interpolated sample values of the analog read signal, and $\sim X_0$ and $\sim X_1$ are estimated sample values corresponding to ideal target gain values, the synchronous gain error for controlling the VGA when the read channel is reading the user data field; and (f) a discrete-time sequence detector for detecting the recorded data from the synchronous sample values.

13. The sampled amplitude read channel as recited in claim 12, wherein the estimated sample values $\sim X_0$ and $\sim X_1$ are programmable to compensate for asymmetries in the analog read signal.

14. A sampled amplitude read channel for reading data recorded on a disk storage medium at a predetermined baud rate by detecting an estimated data sequence from discrete-time sample values generated by sampling an analog read signal from a read head positioned over the disk storage medium, the sampled amplitude read channel comprising:

(a) a variable gain amplifier (VGA) for adjusting an amplitude of the analog read signal before sampling;

(b) a sampling device for sampling the analog read signal to generate the discrete-time sample values;

(c) a coarse gain control circuit, responsive to the discrete-time sample values, for generating a coarse gain error for controlling operation of the VGA to maintain the amplitude of the analog read signal within an optimal operating range of the sample device;

(d) a timing recovery circuit, responsive to the discrete-time sample values of the analog read signal, for generating synchronous sample values substantially synchronized to the baud rate of the recorded data;

(e) a fine gain control circuit for adjusting an amplitude of the synchronous sample values in order to substantially match a spectrum of the synchronous sample values to a partial response, thereby generating partial response sample values at an output of the fine gain control circuit, the fine gain control circuit comprising:

(i) a multiplier for multiplying a programmable coefficient by one of the synchronous sample values;

(ii) a sample value estimator for generating estimated sample values from the synchronous sample values;

(iii) an error generator for generating an error value from the estimated sample values and the synchronous sample values; and (iv) an update circuit for programming the coefficient with an updated value computed in response to the error value; and (f) a discrete-time sequence detector for detecting the recorded data from the partial response sample values output by the fine gain control circuit.

* * * * *